US011543124B2

(12) United States Patent
Hensel et al.

(10) Patent No.: US 11,543,124 B2
(45) Date of Patent: Jan. 3, 2023

(54) APPARATUS AND METHOD FOR CONTINUOUSLY DRYING BULK GOODS, IN PARTICULAR WOOD CHIPS AND/OR WOOD FIBERS COMPRISING A HOT GAS CYCLONE

(71) Applicant: Douglas Technical Limited, Douglas (GB)

(72) Inventors: Günter Hensel, Wegberg (DE); Wolfgang Seifert, Dresden (DE)

(73) Assignee: Kronoplus Limited, Mosta (MT)

( * ) Notice: Subject to any disclaimer, the term of this patent is extended or adjusted under 35 U.S.C. 154(b) by 185 days.

(21) Appl. No.: 16/489,819

(22) PCT Filed: Mar. 3, 2017

(86) PCT No.: PCT/EP2017/055063
§ 371 (c)(1),
(2) Date: Aug. 29, 2019

(87) PCT Pub. No.: WO2018/157945
PCT Pub. Date: Sep. 7, 2018

(65) Prior Publication Data
US 2020/0011529 A1 Jan. 9, 2020

(51) Int. Cl.
*F23G 5/04* (2006.01)
*F23G 5/00* (2006.01)
(Continued)

(52) U.S. Cl.
CPC .............. *F23G 5/04* (2013.01); *F23G 5/006* (2013.01); *F23G 5/46* (2013.01); *F23J 15/025* (2013.01); *F23J 15/027* (2013.01); *F26B 3/04* (2013.01); *F26B 11/04* (2013.01); *F26B 21/04* (2013.01); *F26B 23/022* (2013.01);
(Continued)

(58) Field of Classification Search
CPC .. F26B 3/04; F26B 11/04; F26B 17/32; F26B 21/04; F26B 21/12; F26B 23/022; F26B 23/028; F26B 25/22; F26B 25/007; F26B 2200/24; F23G 5/04; F23G 5/006;
(Continued)

(56) References Cited

U.S. PATENT DOCUMENTS 653,819 A 7/1900 Regout
2,753,925 A 7/1956 Campbell
(Continued)

FOREIGN PATENT DOCUMENTS

CA 2 416 817 A1 2/2003
CN 201233166 Y 5/2009
(Continued)

OTHER PUBLICATIONS

Canadian Office Action for Canadian Patent Application No. 3,053,986, dated Apr. 16, 2021, pp. 1-3, CIPO, Gatineau, Canada.
(Continued)

*Primary Examiner* — Jessica Yuen
(74) *Attorney, Agent, or Firm* — Crowell & Moring LLP

(57) ABSTRACT

An apparatus and a method is provided for continuously drying bulk goods, in particular wood fibers and/or wood chips, in a dryer, wherein the drying vapors are led to a dryer circuit, in which the drying vapors are indirectly heated via a heat-exchanger and are conducted to the dryer again.

16 Claims, 10 Drawing Sheets

(51) Int. Cl.
| | |
|---|---|
| *F23G 5/46* | (2006.01) |
| *F23J 15/02* | (2006.01) |
| *F26B 3/04* | (2006.01) |
| *F26B 11/04* | (2006.01) |
| *F26B 21/04* | (2006.01) |
| *F26B 23/02* | (2006.01) |
| *F26B 25/22* | (2006.01) |
| *F26B 25/00* | (2006.01) |
| *F26B 21/12* | (2006.01) |

(52) U.S. Cl.
CPC .......... *F26B 23/028* (2013.01); *F26B 25/007* (2013.01); *F26B 25/22* (2013.01); *F23G 2204/103* (2013.01); *F23G 2900/50001* (2013.01); *F26B 21/12* (2013.01); *F26B 2200/24* (2013.01)

(58) Field of Classification Search
CPC ............. F23G 5/46; F23G 2900/50001; F23G 2204/103; F23J 15/025; F23J 15/027
See application file for complete search history.

(56) References Cited

U.S. PATENT DOCUMENTS

| | | | |
|---|---|---|---|
| 4,194,455 A | 3/1980 | Mallek | |
| 4,276,835 A | 7/1981 | Zeltner | |
| 4,878,839 A | 11/1989 | Wunning et al. | |
| 5,034,175 A | 7/1991 | Safstrom | |
| 5,237,757 A | 8/1993 | Wiedmann et al. | |
| 5,248,387 A | 9/1993 | Hansen | |
| 5,271,162 A | 12/1993 | Kunz et al. | |
| 5,697,167 A | 12/1997 | Kunz et al. | |
| 6,820,350 B1 | 11/2004 | Eriksson et al. | |
| 8,161,661 B2 | 4/2012 | Bartol | |
| 9,200,834 B1 | 12/2015 | Ball, Jr. et al. | |
| 10,690,409 B2 * | 6/2020 | Brancuzsky | F26B 23/022 |
| 2001/0015160 A1 * | 8/2001 | Brunnmair | F23G 5/32 110/251 |
| 2007/0251120 A1 | 11/2007 | Connell | |
| 2007/0287118 A1 | 12/2007 | Smith | |
| 2008/0271335 A1 | 11/2008 | Kimball | |
| 2009/0241814 A1 | 10/2009 | Bentzen | |
| 2011/0030235 A1 | 2/2011 | Brancuzsky et al. | |
| 2011/0197829 A1 | 8/2011 | Suemitsu et al. | |
| 2011/0305897 A1 | 12/2011 | Hasch et al. | |
| 2016/0209029 A1 | 7/2016 | Kobayashi et al. | |
| 2016/0304800 A1 | 10/2016 | Rautialinen | |
| 2017/0051972 A1 | 2/2017 | Brancuzsky et al. | |
| 2017/0350593 A1 | 12/2017 | Desellem et al. | |
| 2020/0011528 A1 | 1/2020 | Hensel et al. | |
| 2020/0011600 A1 | 1/2020 | Hensel et al. | |
| 2020/0011601 A1 | 1/2020 | Hensel et al. | |
| 2020/0064068 A1 * | 2/2020 | Hensel | F26B 17/106 |

FOREIGN PATENT DOCUMENTS

| | | | |
|---|---|---|---|
| CN | 204268851 U | 4/2015 | |
| EP | 0 457 203 A1 | 11/1991 | |
| EP | 0 459 603 A1 | 12/1991 | |
| EP | 0 714 006 A1 | 5/1996 | |
| EP | 0 876 887 A2 | 11/1998 | |
| EP | 0 876 887 B1 | 6/2003 | |
| EP | 2 375 152 A2 | 10/2011 | |
| JP | H11148626 A * | 6/1999 | |
| WO | WO 03/013808 A1 | 2/2003 | |
| WO | WO 03/013809 A1 | 2/2003 | |
| WO | WO 2009/087108 A1 | 7/2009 | |
| WO | WO 2010/094913 A2 | 8/2010 | |
| WO | WO 2015/056174 A2 | 4/2015 | |

OTHER PUBLICATIONS

Second Chinese Office Action with English translation for Chinese Patent application No. 201780087873.2, dated Apr. 25, 2021, pp. 1-23, Chinese Intellectual Property Office, Beijing, P.R. China.
Ukraine Office Action for Ukraine Patent Application No. 2019 09480, dated May 12, 2021, pp. 1-10, National Intellectual Property Authority, Kyiv, Ukraine.
Second Chinese Office Action with English translation for Chinese Patent application No. 201780087883.6, dated Apr. 22, 2021, pp. 1-23, Chinese Intellectual Property Office, Beijing, P.R. China.
Eurasian Office Action with English translation for Eurasian Patent application No. 201991752, dated Mar. 25, 2021, pp. 1-5, The Eurasian Patent Office, Moscow, Russia.
U.S. Non-Final Office Action for U.S. Appl. No. 16/489,561 dated Apr. 27, 2021, pp. 1-23, United States Patent and Trademark Office, Alexandria, Virginia.
Notice of Allowance for U.S. Appl. No. 16/489,369 dated Apr. 12, 2021, pp. 1-13, United States Patent and Trademark Office, Alexandria, Virginia.
International Search Report issued in International Application No. PCT/EP2017/063707, dated Jul. 13, 2017 pp. 1-2, European Patent Office, Rijswijk, Netherlands.
International Search Report, issued in International Application No. PCT/EP2017/055072, dated Nov. 13, 2017, pp. 1-3, European Patent Office, Rijswijk, Netherlands.
International Search Report, issued in International Application No. PCT/EP2017/055074, dated Nov. 13, 2017, pp. 1-3, European Patent Office, Rijswijk, Netherlands.
International Search Report, issued in International Application No. PCT/EP2017/055073, dated Nov. 13, 2017, pp. 1-3, European Patent Office, Rijswijk, Netherlands.
International Search Report, issued in International Application No. PCT/EP2017/055063, dated Nov. 13, 2017, pp. 1-2, European Patent Office, Rijswijk, Netherlands.
First Office Action with English translation issued in CN Application No. 201780091749.3 dated Apr. 27, 2020, pp. 1-53, Chinese National Intellectual Property Administration, Beijing, China.
Final Office Action for U.S. Appl. No. 16/612,253 dated Aug. 19, 2021, 19 pages.
Non-Final Office Action for U.S. Appl. No. 16/489,788 dated Jun. 22, 2021, 19 pages.
Decision of Rejection for Chinese Patent Application No. 201780087925.6 dated Jul. 28, 2021, 24 pages.
Chinese First Office Action with English translation, issued in CN Application No. 201780087883.6, dated May 28, 2020, pp. 1-29, China Intellectual Property Administration, Beijing, China.
Canadian Office Action, dated Dec. 3, 2020, pp. 1-8, Canadian Patent Application No. 3,053,978, Canadian Intellectual Property Office, Québec, Canada.
Ukrainian Office Action with English Translation for Ukraine Application No. A 2019 11120 dated Jan. 6, 2022, 12 pages.
Final Office Action for U.S. Appl. No. 16/489,788 dated Feb. 15, 2022, 22 pages.

* cited by examiner

APPARATUS AND METHOD FOR CONTINUOUSLY DRYING BULK GOODS, IN PARTICULAR WOOD CHIPS AND/OR WOOD FIBERS COMPRISING A HOT GAS CYCLONE

CROSS-REFERENCE TO RELATED APPLICATIONS

This application is a 371 nationalization of international patent application PCT/EP2017/055063 filed Mar. 3, 2017, which is hereby incorporated by reference.

DETAILED DESCRIPTION

Figure 1:
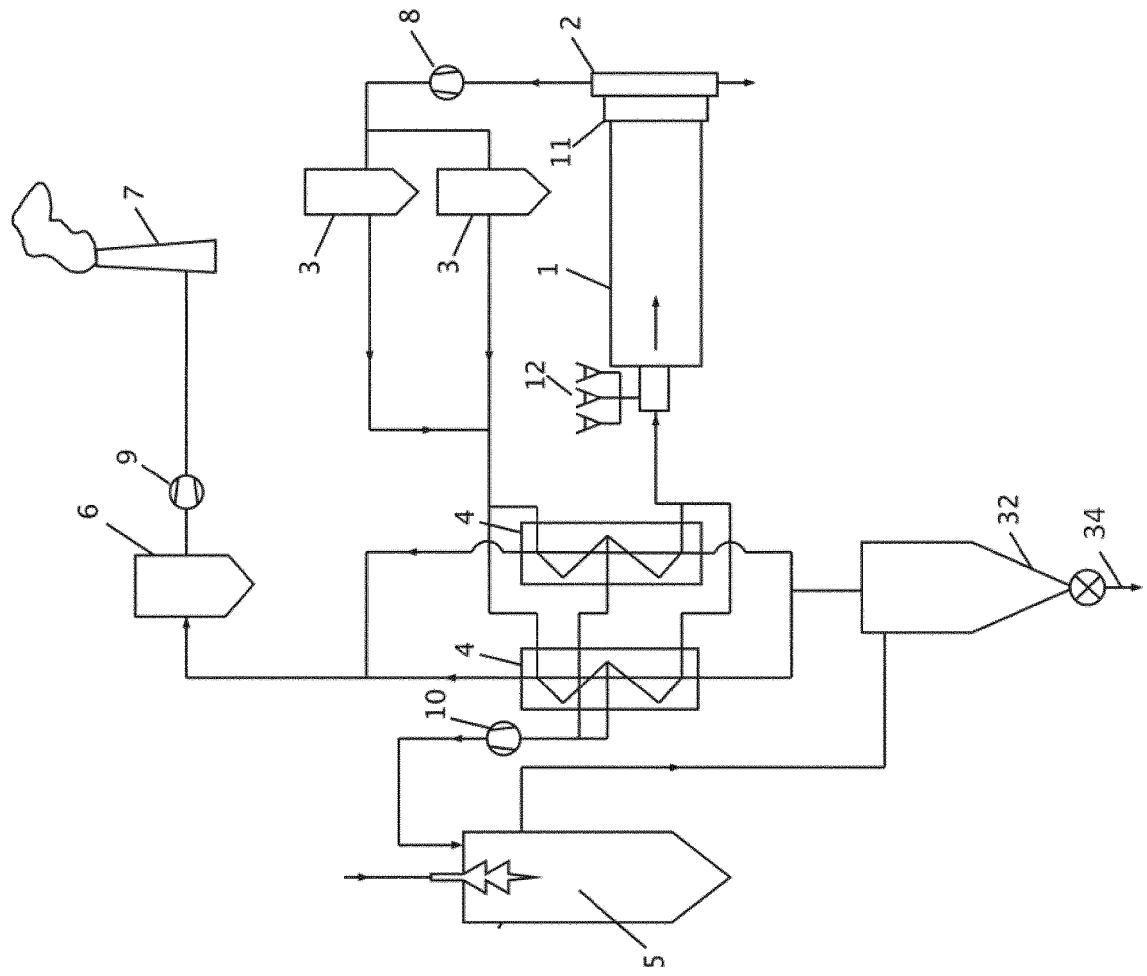
FIG. 1 shows a first example of an inventive.

The present invention relates to an apparatus and a method for continuously drying bulk goods, in particular wood fibers and/or wood chips, in a dryer, wherein the drying vapors are led to a dryer circuit, in which the drying vapors are indirectly heated via a heat-exchanger and are conducted to the dryer again.

The manufacturing of boards made from wood materials is based essentially on the pressing of hackled wood pieces, in particular of wood fibers and/or wood chips. For example, a chip board consists of small wood chips with different thicknesses, which are pressed together with a binder and under application of high pressure to form boards. Wood fiber boards are produced from wooden fiber with or without an additional bonding agent.

Before being pressed to boards, the hackled wood pieces have to be dried. This is usually done in so called drum dryers, wherein the goods to be dried respectively the bulk goods are moved in a heated, rotating tube. During the drying, in addition to water vapor also gaseous wood contents are freed which must not be released to the environment since they are considered as pollutants. The drying vapors are further contaminated with fine particulate matter. For these reasons, the drying vapors have to be cleaned before they can be released to the environment. This is usually achieved by dust removal, filtering and/or a burn-out in the burner of the dryer. To reduce the costs for this treatment of the drying gases and in particular to reduce the additionally necessary energy consumption, different methods and apparatuses are suggested, which enable a more economic process by guiding the drying gases in a circuit and subjecting the same to an indirect heating via a burner.

The European patent application EP 0 459 603 A1 for example describes a drying of wood fibers in a drum dryer, wherein the drying vapors exiting the dryer are led back in a circuit to the dryer and are heated indirectly through the heating gas produced by the burner until they reach the temperatures necessary for drying the wood chips. A part of the drying vapor is removed from this circuit and guided to the combustion chamber. The exhaust gases from the combustion chamber, which are used to heat-up the drying gases via a heat-exchanger, are cleaned with a filter, before they are released to the environment.

The European patent application EP 0 457 203 A1 also describes a drying method among others for wood chips, wherein the drying gases are indirectly heated by a heat-exchanger and wherein the heat-exchanger is energized with the exhaust gases of a combustion chamber. A part of the drying vapors is continuously removed from the dryer and fed to a condenser wherein the water content is condensed and wherein the non-condensable gases are led as combustion air into the combustion chamber.

With these methods the temperatures in the combustion chamber have to be kept sufficiently high, to assure the burning-off of any pollutants. These high temperatures put a strain to the elements of the heat-exchanger so that the lifetime thereof is reduced. For this reason, the European patent application EP 0 714 006 suggests a drying method, wherein a second heat-exchanger is arranged before the first heat-exchanger in order to reduce the thermal strain of the material.

During the drying process in the circuit constantly new vapors are produced which are contaminated with pollutants. The circulating drying vapors therefore have to be continuously removed, to achieve a mass balance. This is done for example by removing a part of the drying vapors downstream or upstream of the heat-exchanger and to guide this part as combustion air to the burning chamber. For the control of the flow rate the European patent application EP 0 714 006 A1 suggests for example a valve.

International Patent Application WO 2009/087108 A1 describes a method and an apparatus for continuously drying bulk goods, in particular wood fibers and/or wood chips in a dryer, which is indirectly heated by a burner exhaust gas, wherein the drying vapors resulting from the dryer are guided and heated up in at least one heat exchanger heated by the burner exhaust gas. At least a part of the dryer vapors is branched off to be conducted into the burner, wherein this partial flow to the burner is driven by means of at least one regularly partial vapor fan.

A problem of the known methods is that the exhaust gases resulting from the burner comprise high amounts of solid particles, such as soot, carbon black, etc., resulting from the combustion process in the burner. Furthermore, solid pollutants are comprised in these fume gases. It is therefore deleterious to directly introduce the burner exhaust gases into the dryer in order to dry solid goods. However, if the burner exhaust gases are used to indirectly heat the vapor gas mixture used for drying the bulk goods in the dryer, it is observed that the heat exchanger, used for heating up the vapor gas mixture can be negatively affected by deposition of solids inside the heat exchanger. These depositions result from the high content of solids in the burner exhaust gases. The deposition of solids, such as e.g. ashes etc. inside the heat exchanger does not only lead to a deteriorated service lifetime of the heat exchanger, it also negatively affects the degree of efficiency of the heat exchange. Furthermore, the cleaning of a heat exchanger, once depositions have occurred, can be very costly and time-consuming, since the deposits inside the heat exchanger can result in an incrustation on the surfaces of the heat exchanger due to the temperatures inside the heat exchanger.

The invention relates to an apparatus for the drying of bulk goods, in particular of wood fibers and/or wood chips, with a dryer, in particular a drum dryer, through which a vapor gas mixture (drying vapors) is passed in a drying circuit. The apparatus further comprises at least one heat-exchanger for the indirect heating-up of the vapor gas mixture and it comprises at least one hot gas generator. The at least one hot gas generator creates exhaust gases, which can be used for the indirect heating of the vapor gas mixture via the at least one heat-exchanger. Further, at least one branch line to the at least one hot gas generator is provided upstream, downstream and/or within the at least one heat-exchanger for a partial flow of the drying vapors and at least one line is provided for the remaining part of the drying vapors to the dryer.

The inventive apparatus is characterized in that at least one hot gas cyclone is provided in between the at least one hot gas generator and the at least one heat exchanger, so that the exhaust gases produced by said at least one hot gas generator are passed through the at least one part gas cyclone.

With the hot gas cyclone, an effective removal of solids inside the exhaust gas is possible. Accordingly, a deposition of said solid particles contained within the exhaust gas, i.e. fume gases in the subsequently aligned heat exchanger can effectively be suppressed. Therefore, less wear and maintenance of the apparatus is necessary. Accordingly, the apparatus according to the invention has a longer service time. In addition, the degree of efficiency inside the heat exchanger can be maintained at high levels, a better overall recuperation of thermal energy is made possible. Thus the apparatus according to the invention is superior to the ones known from the prior art, since overall a better energy efficiency results.

In a specific embodiment, the hot gas cyclone is operated at temperatures below the ash sintering point. Accordingly, the cleaning of the exhaust gases from solid particles is most effective. In addition, an adhesion of solid particles such as e.g. soot or carbon black, can be effectively suppressed.

The hot gas cyclone is preferably equipped with a continuously operated ash/soot discharge system.

The inventive apparatus is preferably characterized in that at least one filter for the cleaning of exhaust gases produced by the at least one hot gas generator is provided, in particular an electrostatic precipitator, preferably a dried type electrostatic precipitator; and downstream of said at least one filter at least one heat exchanger, which indirectly heats gases used as feeding air for said at least one hot gas generator is provided, wherein said at least one heat exchanger is heated by the exhaust gases of the at least one hot gas generator. Said feeding air can be used as combustion air, cooling air, primary air, secondary air, tertiary air or recirculatory air or in the case of a multi-fuel burner as muffle cooling air within said at least one hot gas generator.

In comparable apparatuses known from the prior art, exhaust gases resulting from hot gas generators such as e.g. multi-fuel burners are discharged into the surrounding air without any thermal exchange. Accordingly, large amounts of thermal energy, still contained in the exhaust gases are not recycled and therefore cannot be used to energetically optimize processes carried out with the according apparatuses. The inventive apparatus therefore effectively enhances the overall thermal and energetic yield of the conducted drying process.

Due to the fact that e.g. the combustion air for the at least one hot gas generator is preheated, the degree of efficiency of the at least one hot gas generator is increased. By using preheated air inside the at least one hot gas generator, also effective suppression of the formation of nitrous oxides is achieved.

For example the complete combustion air or a part of the combustion air fed to the at least one hot gas generator can be pre-heated according to the invention.

Preferably, the combustion air is fresh ambient air, gases from production processes such as e.g. press exhaust gases, saw exhaust gases, sanding line exhaust gases and/or exhaust gases from a glue production line or oxygen enriched air.

On the other hand side, the heat exchanger is aligned after or downstream of the filter. Due to this special alignment of the heat exchanger, the functioning of the filter is not affected adversely, on the other hand side already pre-filtered exhaust gases are used inside a heat exchanger. Therefore, a contamination of the heat exchanger can be avoided and the heat exchanger can be operated unimpaired. Less wear and maintenance is observed or necessary.

In a preferred embodiment, the heat exchanger is adjusted so that contained water vapor in the exhaust gases does not condensate. The operation below the dew point of the vapor can be controlled automatically.

In a preferred embodiment an exhaust gas fan is positioned downstream of the aforementioned filter to suck the exhaust gases produced by said at least one hot gas generator through said filter.

Said exhaust gases can finally be discharged into the surrounding through a chimney.

According to another preferred embodiment the apparatus according to the invention is characterized in that said at least one hot gas generator comprises at least one solid fired hot gas generator. A solid fired hot gas generator allows the combustion of combustible organic material in any particular form, such as e.g. bulky wooden goods, particulate wooden goods or even wooden dusts. As examples for a solid fired hot gas generators grate fired hot gas generators, fluidized bed combustion hot gas generators and/or stoker fired hot gas generators are possible which also can be present in combination. However, also multi-fuel burners known from the state of the art are possible. If more than one hot gas generator is present in the apparatus according to the invention, preferably both a solid fired hot gas generator and a multi-fuel burner are present. Accordingly, the apparatus is most flexible as far as possible fuels to cover the energetic need is concerned.

The presence of a multi-fuel burner e.g. allows the combustion of fossil fuels such as gas or light oil, or dust-like solids such as wooden dust which can occur as side product in the drying process or in a following production of chipboards. The fuels can be used alone or in combination with each other. E.g. a mixture of wood dust and light oil or a mixture of wood dust and gas can be used.

A solid fired hot gas generator according to the present invention is enabled to combust solid materials, which cannot be combusted in the multi-fuel burner systems as described in the foregoing. Therefore, an alternative energetic supply concept of the apparatus according to the present invention is possible. With the solid fired hot gas generator, all materials which cannot be used in the production of e.g. wooden particle boards, can be energetically recycled. Examples of such materials are e.g. barks, production wastes of particle boards, wooden chips, packing material and/or waste wood.

Furthermore, it is also possible to co-operate said solid fired hot gas generator in parallel or independent with a multi-fuel burner, i.e. the solid fired hot gas generator can be operated simultaneously or alternatively to the multi-fuel burner. This allows for a very flexible adjusting of the apparatus as far as the energetic supply is concerned. Also in case that the apparatus demands a peak amount of thermal energy the multi-fuel burner can help to deliver additional and quickly available thermal energy in addition to the solid fired hot gas generator.

According to another preferred embodiment the apparatus according to the invention is characterized in that at least one hot gas generator comprises at least one multi-fuel burner and at least one solid fired hot gas generator which are aligned in parallel, said at least one multi-fuel burner comprises a combustion chamber with a muffle in which a fuel/combustion air mixture is ignited and burned and a combustion chamber ceiling, said combustion chamber ceiling comprising
- at least one inlet for combustion air into the muffle,
- an outer nozzle ring forming an inlet for a cooling gas surrounding the muffle and
- an inner nozzle ring forming an inlet for a cooling gas inside the
- muffle providing a laminar flow of cooling gas along the muffle.

A special feature underlying the present invention is that at least said inner and an outer nozzle ring being separately controllable and said inner nozzle ring being fed with gas exhausted by the at least one solid fired hot gas generator, with ambient air and/or with gas resulting from external production processes, such as press exhaust gases, saw exhaust gases, sanding line exhaust gases and/or exhaust gases from a glue production line.

According to this principle, the muffle, in which the fuel/combustion air mixture is ignited, can effectively be cooled. Due to the fact, that the air, entering through the inner nozzle ring preferably comprises considerably minor oxygen content, the formation of nitrous oxides can be reduced.

This advantage enables that post-burner-treatment of the exhaust gas, in order to reduce nitrous oxide, such as e.g. the injection of urea etc. can be reduced or even omitted and leads to considerably less complex apparatuses, which are easier to operate.

In addition and in a preferred embodiment, the gases used to supply the inner nozzle ring of the multi-fuel burner as described above can also be used to be fed into the multi-fuel burner through the outer nozzle ring.

The inventive apparatus is preferably characterized in that said at least one hot gas generator is fed with combustion gases which directly are derived from external process steps such as press exhaust gases, saw exhaust gases, sanding line exhaust gases and/or exhaust gases from a glue production line. These external gases can be used as combustion air, cooling air, muffle cooling air, primary air, secondary air, tertiary air, and/or recirculation air within said at least one hot gas generator. Preferably these gases are pre-heated before entering the at least one hot gas generator, e.g. by means of the above mentioned heat exchanger, in order to further increase the energetic efficiency of the whole system.

Accordingly, the overall emission of an apparatus, which is integrated in an alignment for the production of wooden boards, can be reduced. Furthermore, reduction of emission sources is possible since these sources are thermally disposed within the at least one hot gas generator. Both a reduction of total mass flow of emissions and a reduction of total volume flow of exhaust gases therefore is possible. Especially advantageous is the increase of efficiency by the use of preheated combustion air.

In a yet further preferred embodiment the apparatus according to the present invention is characterized in that said at least one hot gas generator comprises a solid fired hot gas generator which is supplied via the branched line with a partial flow of the drying vapors as secondary and/or tertiary gas.

Accordingly, gas mixtures from the dryer can be used as primary, secondary and/or tertiary air inside the solid fired hot gas generator.

The vapor/gas mixture from the dryer has a reduced concentration of oxygen. Accordingly, the nitrous oxide formation rate inside the solid fired hot gas generator is effectively reduced. Moreover, the air from the dryer has temperatures which are tremendously higher than ambient air. This furthermore affects the probability and reaction rate of the formation of nitrous oxide gases. Furthermore, the gases can be used as cooling gases of the solid fired hot gas generator.

Furthermore, the addition rate of fresh air can be reduced, which normally is firstly preheated before added to the solid fired hot gas generator. Accordingly, the overall energy consumption of the apparatus can be reduced.

In addition, the dryer gases comprise volatile organic components (VOC) and odorous substances. Under the conditions inside the solid fired hot gas generator, these compounds are effectively decomposed and thus can be eliminated.

Preferably, the gases from the dryer are adjusted to temperatures ranging from 150 to 200° C. when fed to the solid fired hot gas generator as secondary and/or primary gas.

The apparatus according to the present invention is preferably characterized in that at least one heat exchanger, which indirectly heats a liquid said at least one heat exchanger is heated by said exhaust gases.

In comparable apparatuses known from the prior art, exhaust gases resulting from the burner are discharged into the surrounding air without any thermal exchange. Accordingly, large amounts of thermal energy, still contained in the exhaust gases are not recycled and therefore cannot be used to energetically optimize processes carried out with the according apparatuses. The inventive apparatus therefore effectively enhances the overall thermal and energetic yield of the conducted drying process.

On the other hand, the heat exchanger is aligned after or downstream of the filter. Due to this special alignment of the heat exchanger, the functioning of the filter is not affected adversely, on the other hand already pre-filtered exhaust gases are used inside a heat exchanger. Therefore, a contamination of the heat exchanger can be avoided and the heat exchanger can be operated unimpaired. Less wear and maintenance is observed or necessary.

In a preferred embodiment, the heat exchanger is adjusted so that contained water vapor in the exhaust gases does not condensate. The operation below the dew point of the vapor can be automatically controlled.

Preferably, the liquid can be a thermal oil or water.

In addition, the invention relates to an apparatus for the manufacturing of wooden material boards comprising at least one crushing device, in particular a milling machine, at least one pressing device and at least one drying device for bulk goods, as it was described above. With regard to further features of this apparatus for the manufacturing of wooden material boards respectively with regard to the drying device of this apparatus it is referred to the above description.

With the inventive method for continuously drying bulk goods, in particular wood fibers and/or wood chips in a dryer in particular a drum dryer, the dryer is fed with the bulk goods, and a vapor gas mixture is guided there through in a drying circuit. Hereby the vapor gas mixture is indirectly heated via at least one heat-exchanger with hot gas generator exhaust gases from a hot gas generator. After passing through the dryer, the drying vapors are guided to the at least one heat-exchanger and are heated-up again. Upstream, downstream and/or within the at least one heat-exchanger, at least a partial flow of the drying vapors is branched off to be guided as cooling air and/or as combustion air to the burner. The remaining partial flow is again guided to the dryer, after it was heated-up in the at least one heat exchanger. Preferably, at least one heat-exchanger is used, which is operated in cross counter flow. Optionally, more than one heat exchanger, such as e.g. two parallel aligned heat exchangers can be used and operated simultaneously. Particularly advantageously, a part of the drying vapors is branched off within the heat-exchanger since a branching off within the heat exchanger provides energetic and emission advantages.

In view of the actual drying method the vapor circuit drying achieves a gentle drying and an oxygen reduced atmosphere with a reduced amount of polluting compounds and thus a quality improvement of the drying goods compared to other drying methods. It allows increasing the flexibility and the softness of the wood chips, which is particularly advantageous in view of the later processing of the wood chips and the quality of the end product. By means of the vapor circuit for the drying, which is achieved by the indirect, essentially oxygen free heating of the drying gases via a heat-exchanger, an inert gas content is achieved, which effects as a further advantage a reduced wear of the apparatus and an increased security due to a reduced risk of fire and explosions.

The inventive method is characterized in that said exhaust gases are passed through at least one hot gas cyclone, which is provided in between the at least one hot gas generator and the at least one heat exchanger. Specific details of the hot gas cyclone have been described above with respect to the apparatus according to the invention and apply in the same way for the inventive method.

In a preferred embodiment the method according to the present invention is characterized in that said hot gas generator exhaust gases are cleaned by at least one filter, in particular an electrostatic precipitator, preferably a dry high electrostatic precipitator; and downstream of said at least one filter the hot gas generator exhaust gases are used to indirectly heat gases as feeding air for said at least one burner by means of at least one heat exchanger. Specific details of the additional heat exchanger have been described above with respect to the apparatus according to the invention and apply in the same way for the inventive method.

The method according to the present invention is furthermore preferably characterized in that said at least one burner comprises a solid fired hot gas generator which is fired with biomass, in particular wooden biomass. However, also multi-fuel burners known from the state of the art are possible.

Furthermore, it is also possible to co-operate said solid fired hot gas generator in parallel with a multi-fuel burner. The solid fired hot gas generator can be operated simultaneously or alternatively to the multi-fuel burner. This allows for a very flexible adjusting of the apparatus as far as the energetic supply is concerned. Also in case that the apparatus demands a peak amount of thermal energy the multi-fuel burner can help to deliver additional and quickly available thermal energy in addition to the solid fired hot gas generator.

Specific details of the solid fired hot gas generator have been described above with respect to the apparatus according to the invention and apply in the same way for the inventive method.

In another preferred embodiment the method according to the present invention is characterized in that the at least one hot gas generator comprises at least one multi-fuel burner and at least one solid fired hot gas generator which are independent or in parallel, said at least one multi-fuel burner comprises a combustion chamber with a muffle in which a fuel/combustion air mixture is ignited and burned and a combustion chamber ceiling, said combustion chamber ceiling comprising at least one inlet for combustion air into the muffle,
an outer nozzle ring forming an inlet for a cooling gas surrounding the muffle and
an inner nozzle ring forming an inlet for a cooling gas inside the
muffle providing a laminar flow of cooling gas along the muffle, said inner and an outer nozzle ring being separately controllable and said inner nozzle ring being fed with gas exhausted by the at least one solid fired hot gas generator and/or with gas resulting from external production processes, such as press exhaust gases, saw exhaust gases, sanding line exhaust gases and/or exhaust gases from a glue production line.

Furthermore said at least one hot gas generator can be fed with feeding gases which are directly derived from external process steps, such as press exhaust gases, saw exhaust gases, sanding line exhaust gases and/or exhaust gases from a glue production line.

It is also preferred if said at least one hot gas generator comprises a solid fired hot gas generator which is supplied via the branched line with the partial flow of the drying vapors as tertiary gas.

Preferably a liquid, such as e.g. water or a thermal oil is heated indirectly by said exhaust gases by means of at least one heat exchanger.

In a preferred embodiment, the partial flow of the drying vapors which is removed upstream, downstream and/or within the heat exchanger to the hot gas generator, is driven by a regulable partial vapor fan.

The regulable partial vapor fan allows a controlled burning off of pollutants in the hot gas generator of the drying arrangement. Due to the regulable partial vapor fan, the flow rate and flow speed of the partial flow of the drying vapors to the hot gas generator can be adjusted to the respective conditions of the drying process. It is for example possible to react to certain properties of the drying goods, as for example moisture content or mass flow, by removing for example a larger partial flow of the drying vapors to the hot gas generator if an increased moisture content is recognized. This secures an optimal process control and an effective removal of pollutants by a burn-out in the hot gas generator. The regulable partial vapor fan allows that the mass respectively volume flows can be increased and that thereby the output of the drying process can be significantly increased. The oxygen content in the dryer can be controlled to a minimum to minimize the production of organic compounds and to thereby reduce the emissions. Additionally, due to the regulable partial vapor fan the burn-out performance as well as the distribution of the vapors in the burning chamber can be influenced whereby the emissions can be further reduced.

Advantageously, upon regulating the partial vapor fan, the mass balance in the system is considered, so that for example the introduction of leak air into the system can be reduced. The uncontrolled intrusion of leak air into the system leads to energetic disadvantages, since the leak air has to be heated-up in the system before it can be used in the process. The control therefore keeps the amount of leak air in a certain corridor.

In a particularly preferred embodiment of the inventive apparatus or method, the control of the partial vapor fan is carried out taking into account the level of pollutants in the exhaust gases of the hot gas generator. The level of pollution may for example be directly measured before the exhaust gases of the hot gas generator are released to the environment, wherein the exhaust gases of the hot gas generator are preferably cleaned beforehand. As levels of pollutants, preferably the concentration of nitrogen oxide and/or the concentration of carbon monoxide of the exhaust gases of the hot gas generator can be considered in order to regulate the partial vapor fan. According to the invention it can be provided, that certain thresholds of these concentrations are determined and that the regulable partial vapor fan is effected if these pollution thresholds are not met. Further, according to the invention it may be provided that a control of the regulable partial vapor fan is carried out considering the oxygen content in the exhaust gas of the hot gas generator. Depending on the fuel used for example the control may be carried out according to an oxygen content of approximately 3 Vol % up to approximately 11 Vol % in the exhaust gas.

In a further preferred embodiment of the inventive apparatus or method, the control of the regulable partial vapor fan is carried out taking into account the maximum inert gas content in the drying circuit, preferably by measuring the oxygen content and/or the water content in the drying vapors. Thereby an increased output of the drying method as well as an increased quality of the drying goods, for example an improved quality of the wood chips, can be achieved. By maximizing the inert gas content in the drying circuit the deposition, pollution and thus the wear of different parts of the apparatus are kept to a minimum. Additionally, the security of the apparatus is increased due to the minimization of the risk of fire and explosion.

In a preferred embodiment of the inventive apparatus or method the exhaust gases of the hot gas generator, which are removed from the system, are passed to a filter, in particular an electrostatic precipitator preferably a dry type electrostatic precipitator for cleaning therefore. A filtering of the exhaust gases of the hot gas generator is particularly advantageous in the case of wood dust being burned in the burning chamber to reduce the emissions. An electrostatic precipitator has the advantage that compared to ordinary bag filters the risk of fire is reduced. A dry type electrostatic precipitator has shown to be particularly effective in cleaning the exhaust gases of the hot gas generator. It is particularly preferred to operate the filter, in particular the electrostatic precipitator, in a suction operation, wherein preferably downstream of the filter a hot gas generator exhaust gas fan is arranged. The suction operation is advantageous, since the under pressure deriving there from offers advantages with regard to the construction of the filter and since the fan is protected from wear.

In case that the at least one hot gas generator is a multi-fuel burner ordinary fossil fuels may be used as fuel such as e.g. natural gas or oil. In a particularly preferred embodiment additionally or alternatively particulate solids can be used, in particular biomass. For example, waste from the production of the wooden boards, as for example wood dust or similar, may be burned. The advantage of this process is, that waste, which is produced anyway, can be used as fuel in the combustion chamber.

In the solid fired hot gas generator coarser fuel can be used, such as e.g. wooden chips or even wooden plates or any other combustible biomass.

In a preferred embodiment of the inventive apparatus or method a cleaning device is provided for the drying vapors, which vapors contain in particular fine dusts and different organic parts deriving from the drying of the bulk goods. As cleaning device, one can for example use a cyclone separator, in particular one or more cyclone batteries. Inside of the cyclone the solid or liquid particles, as for example fine dusts, contained in the drying gases are separated, by transferring the drying gases into a rotary motion, whereby the centrifugal force acting on the particles will accelerate the particles and move them radically outwardly. Thereby the particles can be separated from the gas and may preferably be removed downwards. Between the dryer and the cleaning device, as for example the cyclone batteries, and/or between the cleaning device and the heat-exchanger the drying vapors are preferably driven by means of a drying vapor fan. Due to the flow circuit of the drying gases the drying vapor fan is protected from dirt and thus from wear.

In a particularly preferred embodiment of the inventive apparatus or method the water content in the dryer is controlled. The bulk goods, as for example the wood fibers or wood chips, are advantageously separated to different fractions depending on the moisture content and the bulk goods are metered from the different fractions via a metering device, such that a desired moisture content can be maintained in the bulk goods introduced to the dryer. For example, three silos each containing a certain fiber type may be provided, wherein each fiber type has a particular moisture content. The moisture of the bulk goods to be dried, and which are moved to the dryer, can for example be continuously measured. For example by means of a detected program the composition of the drying goods can be controlled in such a way that a continuous water flow in the dryer can be secured. The control can be achieved in a particularly advantageous manner such that the water flow in the dryer remains constant. This control of the water content in the dryer has the advantage that differing moisture contents in the drying goods, as for example the wood fibers, can be balanced out. Further, due to the control of the water content in the dryer, the inert gas content in the drying circuit can be optimized which is advantageous for example in view of the quality of the drying goods and in addition increases the output of the drying process.

In a particularly preferred embodiment of the inventive apparatus or method further exhaust gases are fed to the hot gas generator as combustion air, as cooling air and/or for muffle cooling. Preferably these further exhaust gases are taken from the production process of the wood material boards, as for example exhaust air from the pressing devices, exhaust gases from the sawing devices etc. This integration of different emission sources into the inventive apparatus or method has the advantage that the different exhaust gases can be post-treated in the combustion chamber, to thereby achieve a burn-out of the pollutants in the exhaust gases. Due to economic reasons it is preferred to post treat all the different exhaust gases, in particular all the exhaust gases deriving from the manufacturing of the wood material boards in this way. Preferably, the additional exhaust gases are pre heated before they are supplied as combustion air. To this aim different heat-exchangers may be provided, as for example thermal oil heat exchanges. By pre heating the exhaust gases before the same are guided to the combustion chamber the necessary temperature in the combustion chamber can be achieved in a particularly economic manner.

In a particularly preferred embodiment of the inventive apparatus or method the cooling air supply to the hot gas generator is achieved via an interior and an exterior nozzle ring in the ceiling of the combustion chamber. It is particularly preferred, that these nozzle rings can be controlled separately from each other. Preferably, the inner nozzle ring and/or the outer nozzle ring are provided with a pre-adjusted entering angle for the respective fuel which is in the range between approximately 0, preferably 10 and approximately 60 degrees. Due to this construction of the cooling air supply respectively of the ceiling of the combustion chamber and the particular air supply in the combustion chamber as well as the guiding of the secondary air and the condensation deriving there from, combustion in the combustion chamber is achieved in a particularly advantageous manner.

The cooling air supply into the hot gas generator can for example be taken from the partial vapor flow, which is for example branched off from the heat-exchanger. The control of the different rings is preferably achieved with suitable valves.

In a further preferred embodiment of the inventive apparatus or method, the muffle of the multi-fuel burner is cooled. For example, the muffle may be cooled with fresh air. In another preferred embodiment the cooling of the muffle is done with process air. For example, one can use as cooling air for the muffle which is branched off from the partial flow of the drying vapors, or from partial flows branched off the drying vapors upstream, downstream and/or from within the heat exchanger(s).

In alternative embodiments exhaust gases of the multi-fuel burner and/or the solid fired hot gas generator are used as cooling air, after the same are passed though the heat-exchanger and/or exhaust gases, which are branched off before releasing via the chimney and in particular exhaust gases which have been passed through the filter. The control of the muffle cooling is preferably dependent on the temperature of the muffle, to protect the muffle. The control can further be done dependent on the carbon monoxide content of the exhaust gases, wherein additionally the temperature control of the muffle can be used.

The invention further relates to a method for the manufacturing of wooden material boards, wherein wood logs are stripped of bark and are processed in a crushing device to fibers and/or wood chips, in particular in a milling machine. The chips and/or fibers are dried in a drying apparatus and—if necessary by adding binders and/or further additives—processed to boards in a pressing device and if necessary cut to size. This method is characterized in that for the drying of the chips and/or fibers a method is used as it was described above. With regard to further features of the method for the manufacturing of wooden material boards it is referred to the above description.

The inventive apparatus or method for drying bulk goods is in particular suited for the drying of wood chips. The inventive vapor atmosphere in the drying circuit has positive effects to the quality of the wood chips.

The gentle drying of the wood chips realized thereby achieves flexible and soft wood chips, which do not show any thermal discoloration. Due to the inert gas atmosphere during the drying the ignition potential of the drying goods and thus the fire hazard in the dryer respectively in the whole apparatus can be reduced. The same is true, if the inventive method is used for the drying of wood fibers. When drying wood fibers it is in particular the inventive controlled and adjusted moisture content in the drying goods which is advantageous, since the moisture of wood fibers is usually very problematic in the subsequently following processing of the fibers, in particular in the press section. Different from the processing of wood chips no intermediate storage of the dried wood fibers takes place. Rather, the pressing of the wood fibers follows directly after the drying, so that the moisture content of the drying goods corresponds directly to the moisture in the press section. The inventive method has the advantage that a controlled and continuous quality of the dried bulk goods can be provided for the further processing.

Figure 2:
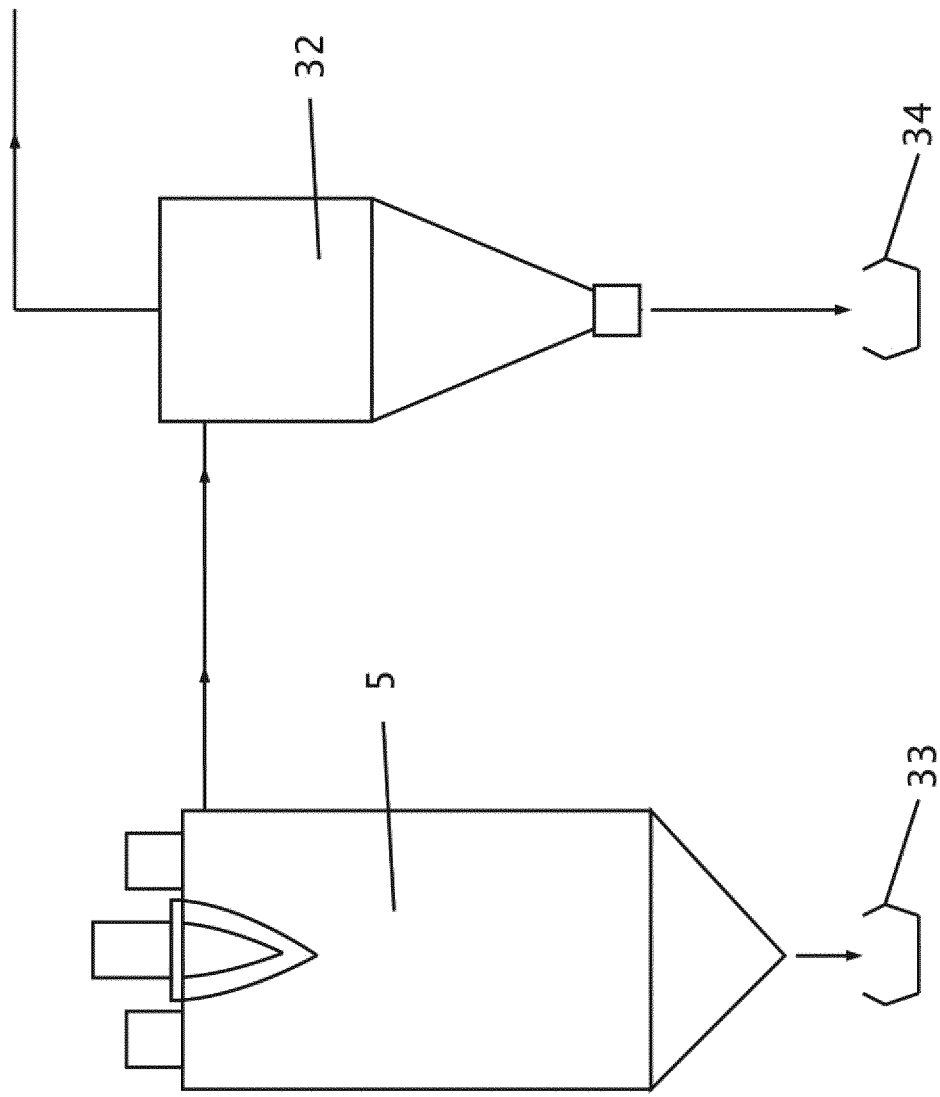
FIG. 2 shows a detail of the apparatus.

Further advantages and features of the invention derive from the following description of the drawings in connection with the preferred embodiments. Hereby, the different features may be realized alone or in combination with each other. In the drawings:

FIG. 1 shows a schematic illustration of a process picture for an apparatus, which is suitable for a preferred embodiment of the inventive method;

FIG. 2 shows a schematic illustration of a process picture for an apparatus to realize a preferred embodiment of the inventive method with extension in the air circuitry; and FIG. 1 shows a first example of an inventive apparatus to put the inventive method into practice. The apparatus comprises a drum dryer 1, a discharge housing 2, two cleaning apparatuses 3 which are operated in parallel, two heat-exchangers 4 which are operated in parallel, a hot gas generator (in the case of FIG. 1 a multi fuel burner 5 with a combustion chamber) for the combustion of a fuel/combustion air mixture, a filter 6 as well as a chimney 7. The drying vapors generated by the drying of e.g. wooden chips inside the drum dryer 1 are lead in a drying circuit. A drying vapor fan 8 is arranged between the drum dryer 1 and the cleaning apparatuses 3, a burner exhaust fan 9 is arranged between filter 6 and chimney 7 and between heat-exchanger 4 and combustion chamber 5 a regulable partial vapor fan 10 is arranged. Dryer 1 may be provided with a slow-down zone 11 and a metering device 12. The inlet for fuel into the burner 5 is not shown in detail.

The drum dryer 1 is supplied with bulk goods, as for example with wooden chips and/or wooden fibers. The drying gases which are supplied to the drum dryer 1 are heated-up via the heat exchanger 4 and have temperatures in the range of approximately 250° C. up to approximately 600° C. The heating of the drying gases in the heat-exchangers 4 is achieved in cross counter flow by means of exhaust gases from the combustion chamber generated by the multi-fuel burner 5. The exhaust gases have temperatures in the range of approximately 750° C. up to approximately 900° C. Inside of the combustion chamber temperatures of approximately 750° C. up to 1050° C. are achieved, wherein as fuel for example natural gas, oil and/or wood dust or other waste materials from the production of wooden material boards may be used. The different fuels may be used alone or in any combination with each other.

After the drying goods have passed the drum dryer 1 one slow-down zone 11 may be provided for the drying goods and/or a discharge housing 2 to remove the dried bulk goods. The drying gases or the drying vapors, respectively, are driven via the drying vapor fan 8 to one or more cleaning apparatuses 3, preferably cyclone separators. Alternatively or additionally a drying vapor fan may be arranged between the cleaning device 3 and the heat exchanger 4. In the cleaning device 3, fine dust and other particles are separated. The separated material may then advantageously be passed to the production or combusted in a hot gas generator such as e.g. the multi-fuel burner 5. After the drying vapors have passed the cleaning devices 3, they are guided to one or more heat-exchangers 4. Inside of the heat-exchanger 4 the drying vapors are heated from approximately 110° C. to 130° C. up to 250° C. to approximately 600° C. This is done in a cross counter flow operation by means of the exhaust gases of the multi-fuel burner 5 from the combustion chamber. Inside of the heat-exchangers 4 a part of the vapor is separated and led to the multi-fuel burner 5 as combustion air and/or cooling air. This part of the vapor is driven by the regulable partial vapor fan 10. The exhaust gas of the multi-fuel burner 5, which serves to heat-up the drying gases in heat-exchangers 4, is guided—after passing through the heat-exchangers 4—to a filter 6. This is in particular an electrostatic precipitator, preferably a dry type electrostatic precipitator. The filter 6 is preferably operated in a suction operation, whereby after the filter 6 a fan 9 for the exhaust gas of the burner is provided. The thus cleaned exhaust gas of the burner is released via chimney 7 into the environment.

According to the invention, the drying of the wood chips is done in a dedicated vapor circuit. Thereby a high vapor content can advantageously be achieved and thus a gentle drying can be realized, which has a positive effect on the quality of the drying goods. Further, thereby the pollution and thus the wear of the drying circuit can be kept to a minimum. Also the fire protection can be improved due to the indirect heating of the dryer and the dedicated drying circuit.

The regulation (i.e. control) of the regulable partial vapor fan 10 is done in a preferred embodiment via the pollution level of the exhaust gases of the burner, as for example by means of the concentration of nitrogen oxides and/or the concentration values of carbon monoxide. Further, the regulable partial vapor fan may be controlled via a maximum inert gas content in the drying circuit or via the oxygen contend in the exhaust gas of the multi-fuel burner 5.

In a preferred embodiment, the supply of the drum dryer 1 with bulk goods is done while controlling the water content in the dryer by means of the metering device 12, whereby the bulk goods are metered depending on the moisture of different bulk good fractions upon supply to the drum dryer 1.

Preferably different exhaust gases from the manufacturing of the wooden material boards are used as combustion air for the multi-fuel burner 5, as for example exhaust gases from the press arrangements, exhaust gases from the sawing arrangements and/or exhaust gases from the boiler. The different exhaust gases are preferably pre-heated before they are supplied as combustion air, in particular by means of heat-exchangers. These gases also can be supplied to a grate fired hot gas generator 31, if present.

The apparatus according to the invention furthermore comprises a hot gas cyclone 32 into which both the exhaust gas produced by the multi-fuel burner 5 and—if present— the grate fired hot gas generator 31 are fed and cleaned from solid particles which are entrained in the exhaust gas of said hot gas generators, such as e.g. ashes, soot, carbon black etc. The collected solids are discharged via lock 34.

FIG. 2 shows a detail of the apparatus displayed in FIG. 1. In this detail the hot gas cyclone 32 for cleaning of the exhaust gases generated by the multi-fuel burner 5 is displayed. As displayed in FIG. 2 also the multi-fuel burner 5 can comprise a lock 33 through which solids such as ashes or soot etc. can be discharged.

Figure 3:
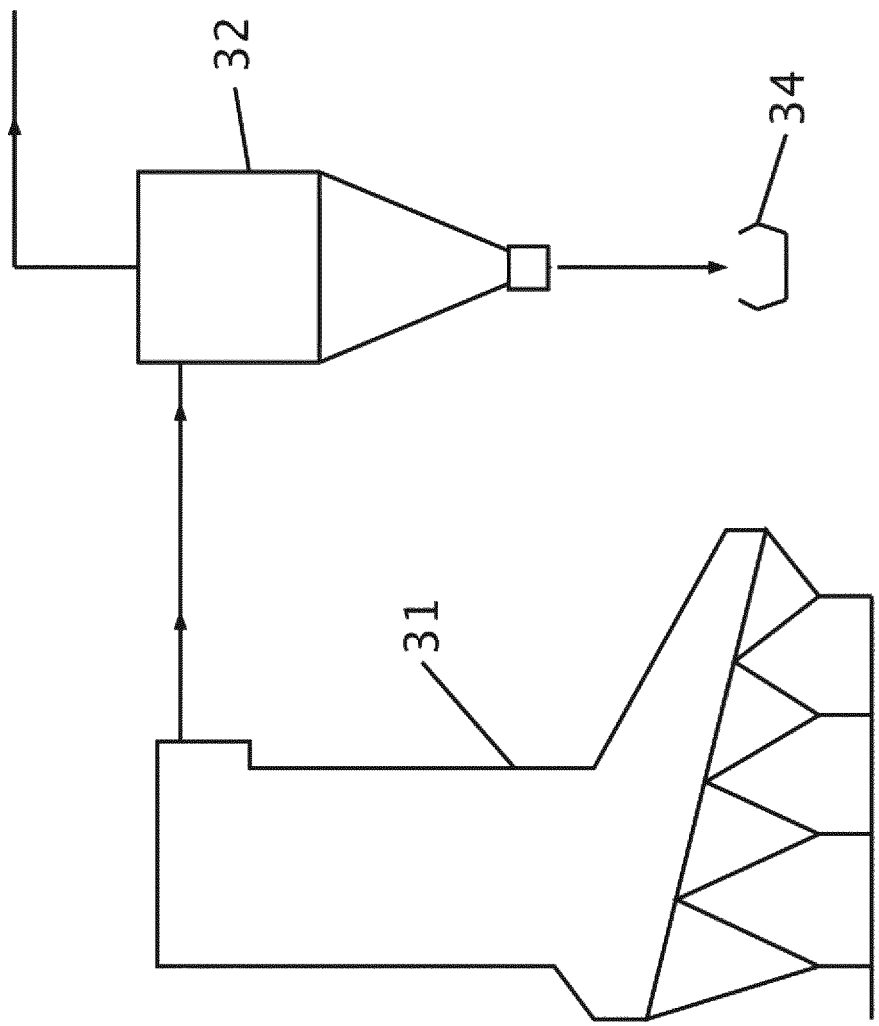
FIG. 3 shows an alternative embodiment of the apparatus.

FIG. 3 shows an alternative embodiment of the apparatus disclosed in FIG. 1 or FIG. 2. Instead of a multi-fuel burner 5 this apparatus comprises a grate fired hot gas generator 31, the exhaust gases of which are cleaned by a hot gas cyclone 32.

Figure 4:
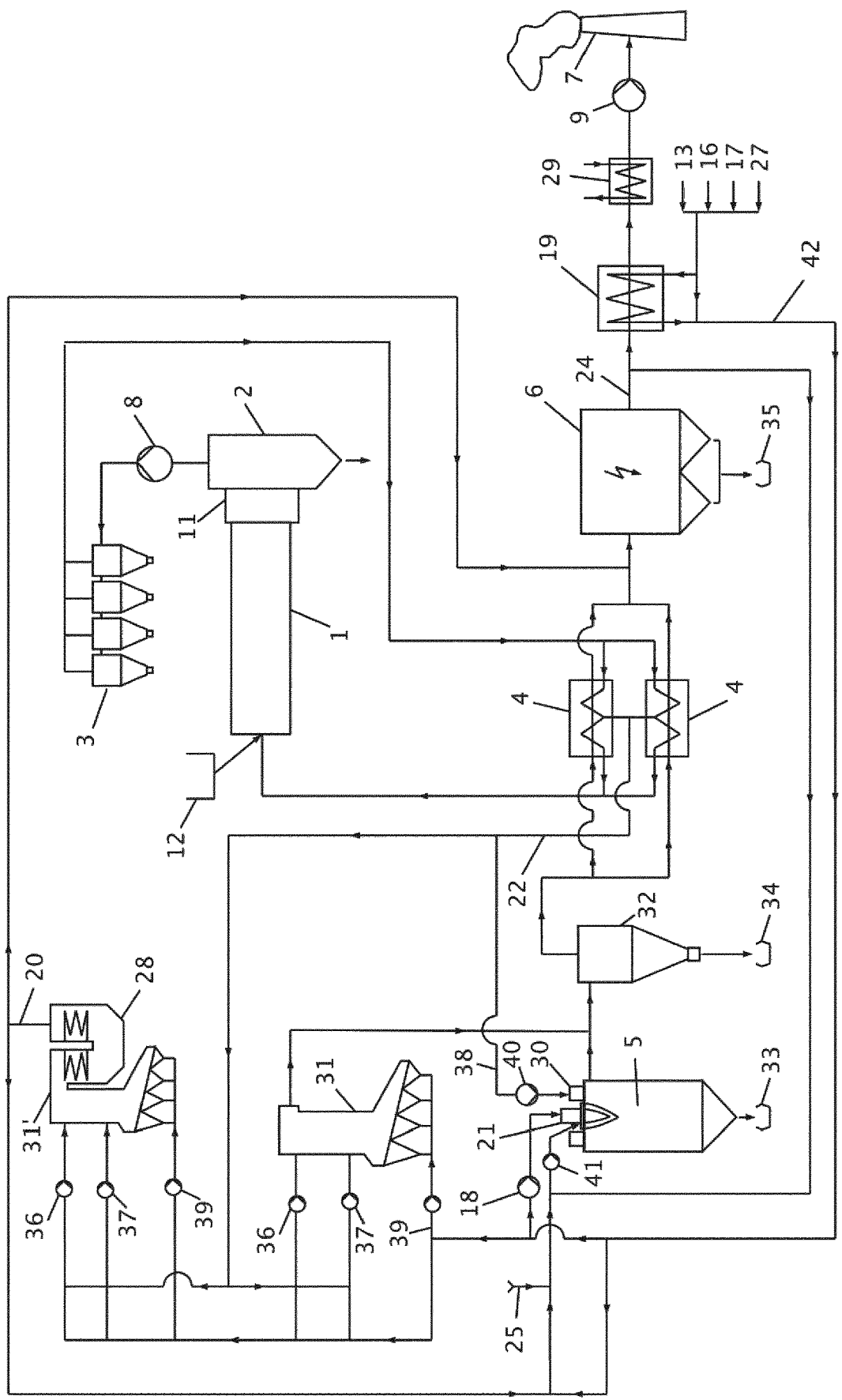
FIG. 4 shows another example of an inventive apparatus.

FIG. 4 shows another example of an inventive apparatus to put the inventive method into practice. The same reference numerals refer to the same parts as described for the apparatus shown in FIG. 1. In addition to the apparatus displayed in FIG. 1, the apparatus according to FIG. 4 comprises a first grate fired hot gas generator 31 which is aligned in parallel to the multi-fuel burner 5. This grate fired hot gas generator 31 is fed with solid combustible material, which e.g. can be waste wooden material etc. This material can be coarser than the material used as fuel for the multi-fuel burner 5 and comprises e.g. wooden chips or even wooden boards. The presence of the grate fired hot gas generator 31 therefore especially allows for the complete thermal recycling of materials which are e.g. generated anywhere during the production processes of chipboards or wooden articles. The grate fired hot gas generator 31 is operated with primary gas 39 which can be e.g. fresh ambient air 13. The primary gas can be tempered to elevated temperatures, alternatively the primary air can be used as taken from the surrounding. As described in the foregoing for the multi-fuel burner 5, also the grate fired hot gas generator 31 is supplied with a partial stream 22 of dryer gases via a separate regulable partial vapor fan 36 or 37. The vapor gases branched off the heat exchanger 4 can be added to the grate fired hot gas generator 31 as secondary air 37 or tertiary air 36.

The exhaust gases generated by the grate fired hot gas generator are also led to the hot gas cyclone 32, which is also used to clean the exhaust gases of the multi-fuel burner 5. Accordingly, this assembly enables a parallel operation of the multi-fuel burner 5 and the grate fired hot gas generator 31. This assembly also allows the alternative operation of the multi-fuel burner 5 or the grate fired hot gas generator 31. The gases cleaned by the hot gas cyclone 32 are subsequently used to heat the vapor gases for drying the wooden chips and/or fibers inside the drum dryer 1 by indirect heat exchanging inside the heat exchangers 4.

The primary air 39 fed to the grate fired hot gas generator 31 preferably can be preheated by means of a heat exchanger 19, which is aligned downstream of the filter 6. The filtered exhaust gases 24 are led through the heat exchanger 19, accordingly fresh ambient air 13 can be preheated before being fed to the hot gas generator 31. Alternatively and/or in addition, also additional air-streams, such as press or saw exhaust gases 16, sanding line exhaust gases 17 and/or exhaust gases from a group production line 27 can be preheated in the heat exchanger 19 and fed to the grate fired hot gas generator 31 as primary air. In addition or in the alternative, the aforementioned gases 13, 16, 17 and 27 can also be used as secondary air 37 and/or tertiary air 36 and fed to the grate fired hot gas generator above the primary firing zone. The secondary and/or tertiary gas streams are to reduce the nitrogen oxide content of the exhaust gases generated by the grate fired hot gas generator 31 and/or are used as cooling air.

The multi-fuel burner 5 comprises a muffle 21, in which the combustion is taking place. The gases 13, 16, 17 and/or 27 can be used as primary air and fed into the muffle 21 as combustion air. Inside the muffle combustion air/fuel mixture is ignited and combusted. The mixing of the primary air and the fuel is not displayed in FIG. 4. This primary air can be propelled by separate primary air fan 18. Furthermore, drying vapors, which are branched off at 22 from the heat exchangers 4 can be used as cooling air 38 and fed into the multi-fuel burner 5 via a cooling air fan 40 at an outer nozzle ring 30. In addition, the multi-fuel burner 5 is also provided with an inner nozzle ring, into which muffle cooling air can be supplied via a muffle cooling air fan 41. With this inner nozzle ring a laminar flow of muffle cooling air is provided inside the muffle 21, which effectively protects the muffle from 21 from overheating. As muffle cooling air, e.g. fresh ambient air 25 and/or exhaust gases provided by an additional grate fired hot gas generator 31' can be used.

Accordingly, the apparatus according to FIG. 4 comprises an additional grate fired hot gas generator 31', which can be provided with the same gas streams as the grate fired hot gas generator 31. In addition to the grate fired hot gas generator 31, the grate fired hot gas generator 31' comprises an additional thermal oil boiler house 28, in which heat exchangers for recuperation of the thermal energy of the exhaust gases or generated by the grate fired hot gas generator 31' are provided. The exhaust gas stream 20 is divided into two parts. A first part is used as muffle cooling air for the multi-fuel burner and added through the inner nozzle ring by means of the muffle cooling air fan 41. The second part of the exhaust gas stream 20 is directly led to the filter 6 and thermally exploited in the heat exchanger 19.

Downstream of the heat exchanger 19 a further heat exchanger 29 is aligned, in which e.g. hot water or hot thermal oil can be produced. Accordingly, a further energetic exploitation of the thermal energy still contained in the exhaust gas stream can be provided.

Finally, the exhaust gas stream is exhausted via chimney 7.

Figure 5:
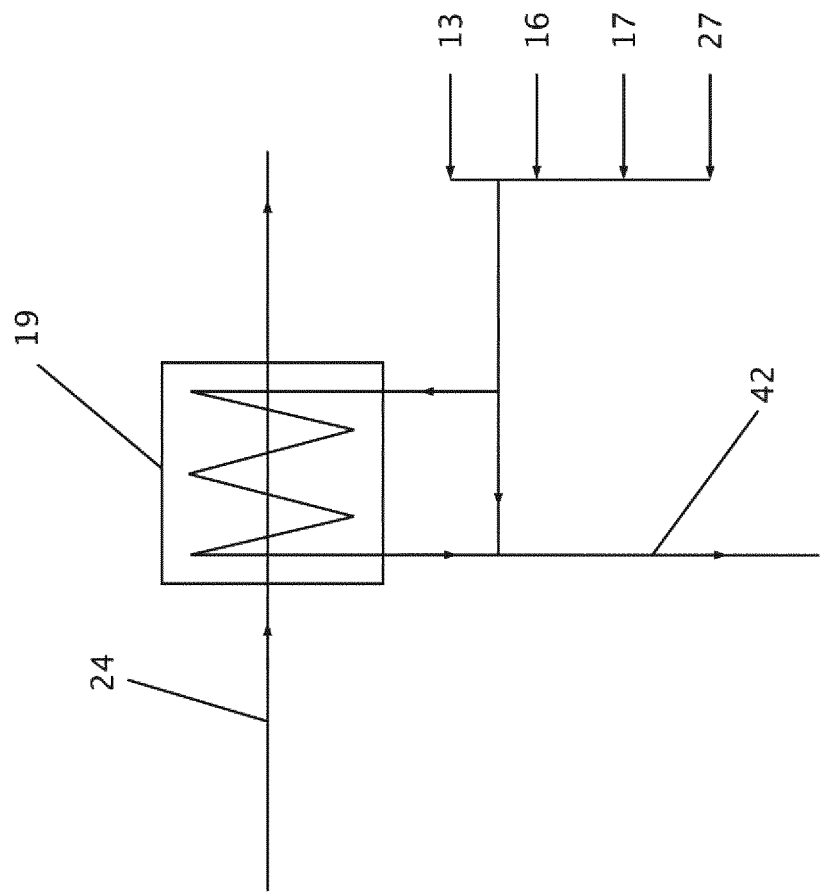
FIG. 5 shows a detail of FIG. 4.

FIG. 5 shows a detail of FIG. 4, in which the heat exchanger 19 is shown in greater detail. As becomes apparent from FIG. 5, the exhaust gas stream from 24, which has been cleaned by filter 6, is led through the heat exchanger 19 in order to heat the gas streams numerated with reference numeral 13, 16, 17 and/or 27 as discussed in the foregoing. A preheated gas stream 42 leaves the heat exchanger 19 and can be fed to the multi-fuel burner 5 or any of the grate fired hot gas generators 31 and/or 31'.

Figure 6:
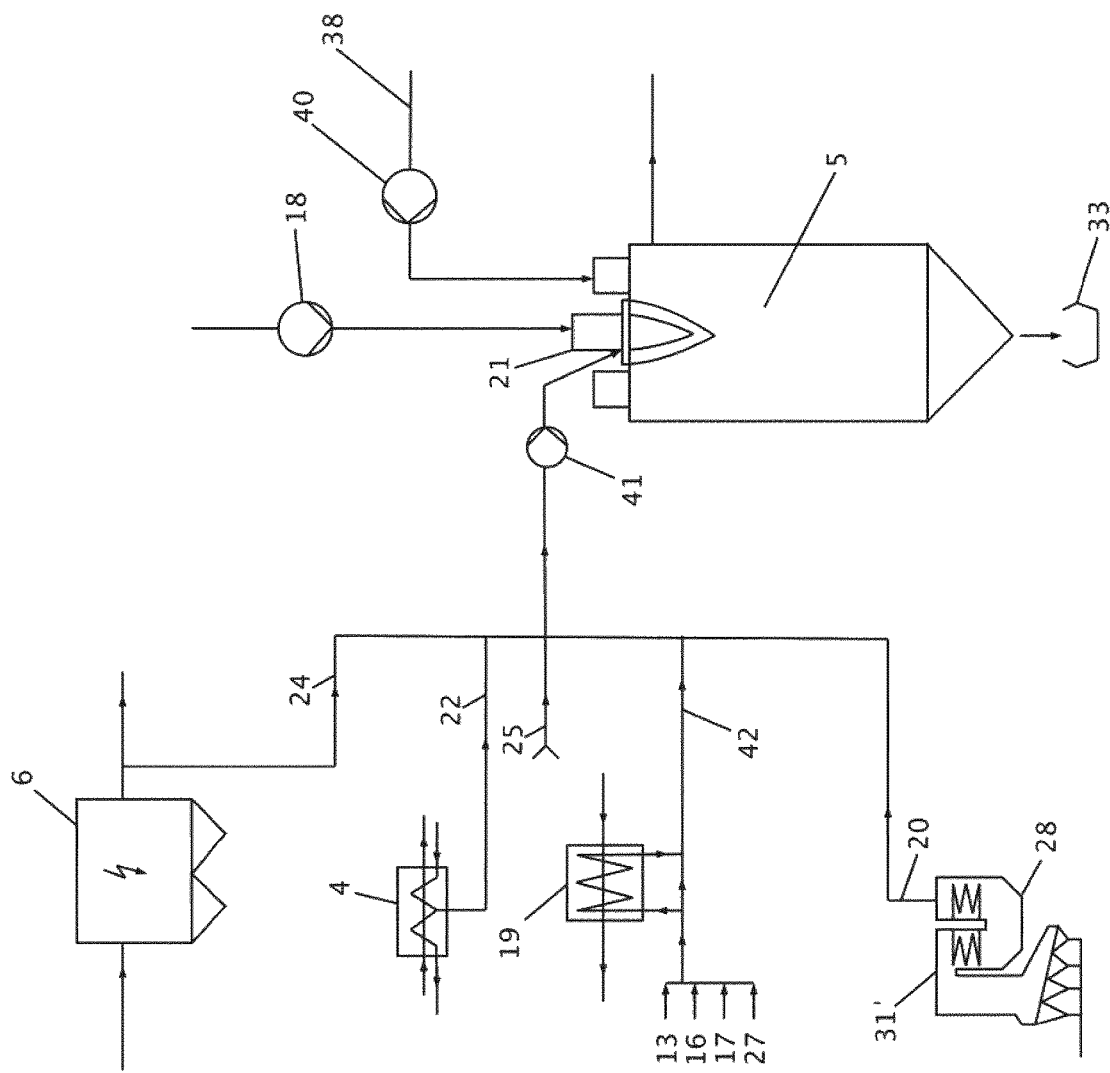
FIG. 6 shows details of FIG. 4.

FIG. 6 shows details of FIG. 4, in which the air supply of the multi-fuel burner 5 is displayed in greater detail. As becomes apparent, the multi-fuel burner 5 has three distinct air-supplies, namely the supply of primary air, which can be fed by primary air fan 18. The primary air is fed directly into the muffle 21, in which a mixture of the primary air and the fuel is generated and ignited. Furthermore, the multi-fuel burner 5 is supplied with cooling air 38 which can be supplied to the multi-fuel burner 5 via outer nozzle rings and by means of regular level cooling air fan 40. The cooling air 38 can be e.g. branched off (see reference numerals 22 in FIG. 4) from the heat exchanger 4. The cooling air can effectively be used to cool the combustion chamber of the multi-fuel burner 5. In addition, the muffle 21 can be provided with additional muffle cooling air, which can be fed to the multi-fuel burner 5 via inner nozzle rings. This muffle cooling air directly is fed inside the muffle 21 and effectively cools the muffle. The muffle cooling air can be provided by means of a separate fan 41. As muffle cooling air e.g. ambient air 25, but also drying vapors, which can be branched off (see reference numeral 22) from the heat exchanger 4 can be used. In addition or in alternative thereto, also cleaned exhaust gases, which can be stripped off from the exhaust gas stream after the filter 6 can be used. In addition or in alternative thereto, also pre-heated gases, provided as gas stream 42 after the heat exchanger 19 can be used. In detail, these gases can be pre-heated ambient air 13, press and/or saw exhaust gases 16, sending aligned exhaust gases 17 and/or exhaust gases from a group production line 27. In addition or in alternative thereto, as muffle cooling air also exhaust gases provided from a separate grate fired hot gas generator 31' can be used.

Figure 7:
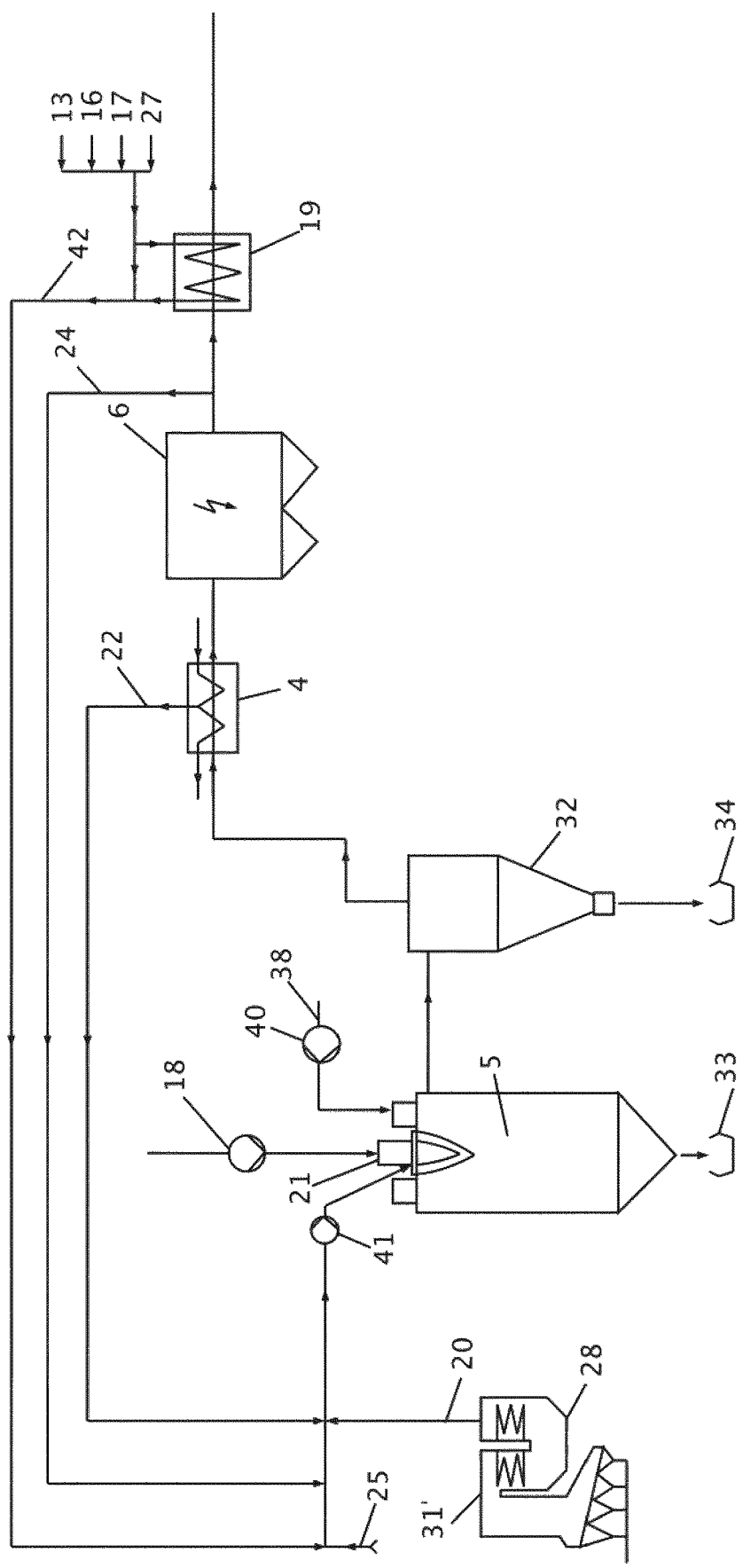
FIG. 7 shows another detail of FIG. 4.

FIG. 7 shows another detail of FIG. 4, in which the complete situation of feeding air and of the gas exhaust generated by the multi-fuel burner 5 is displayed. The feeding situation of the multi-fuel burner 5 is identical to the situation displayed in FIG. 6. In addition, the hot gas cyclone 32 is visible, which is used for cleaning the exhaust gas generated by the multi-fuel burner 5. Also the fate of the exhaust gas stream after the passing of the hot gas cyclone 32 is shown. The exhaust gases are led to the heat exchanger 4 which is used to heat the drying gases (not shown). Afterwards, the exhaust gases pass an electrostatic filter 6 as well as a heat exchanger 19.

Figure 8:
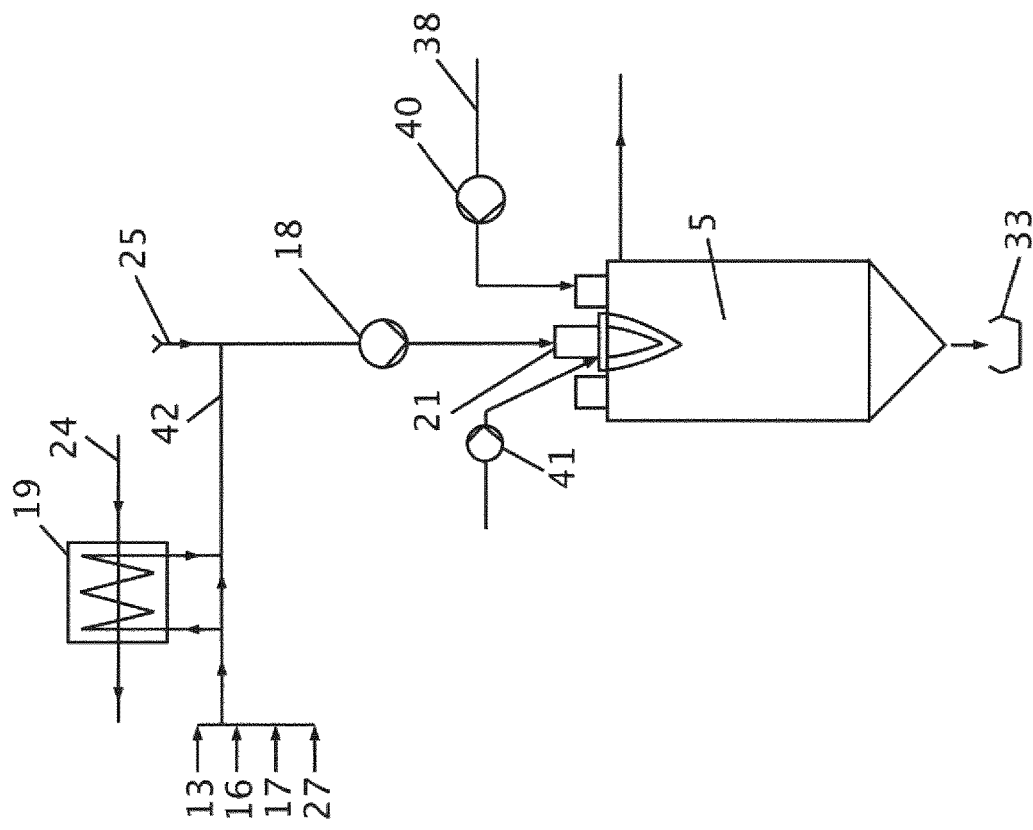
FIG. 8 shows an alternative embodiment.

In an alternative embodiment as shown in FIG. 8, the possibility is given that ambient air 25 can be used in addition to the pre-heated gas stream 42 as primary air used in a multi-fuel burner 5.

Figure 9:
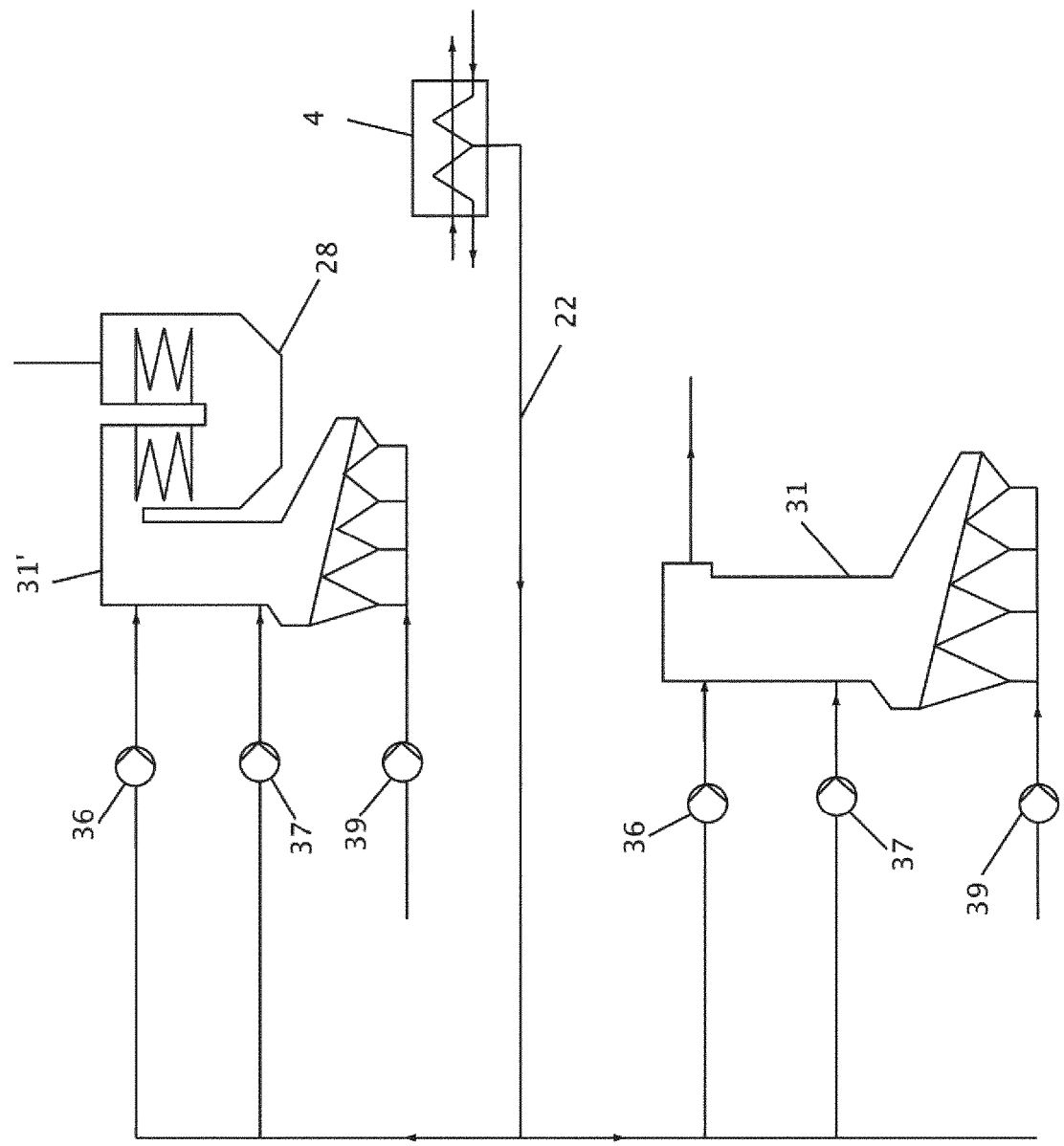
FIG. 9 shows an embodiment.

FIG. 9 shows an embodiment, in which two grate fired hot gas generators 31 and 31' are supplied with branched off gases (reference numeral 22) from the heat exchanger 4, both as secondary air 37 and tertiary air 36.

Figure 10:
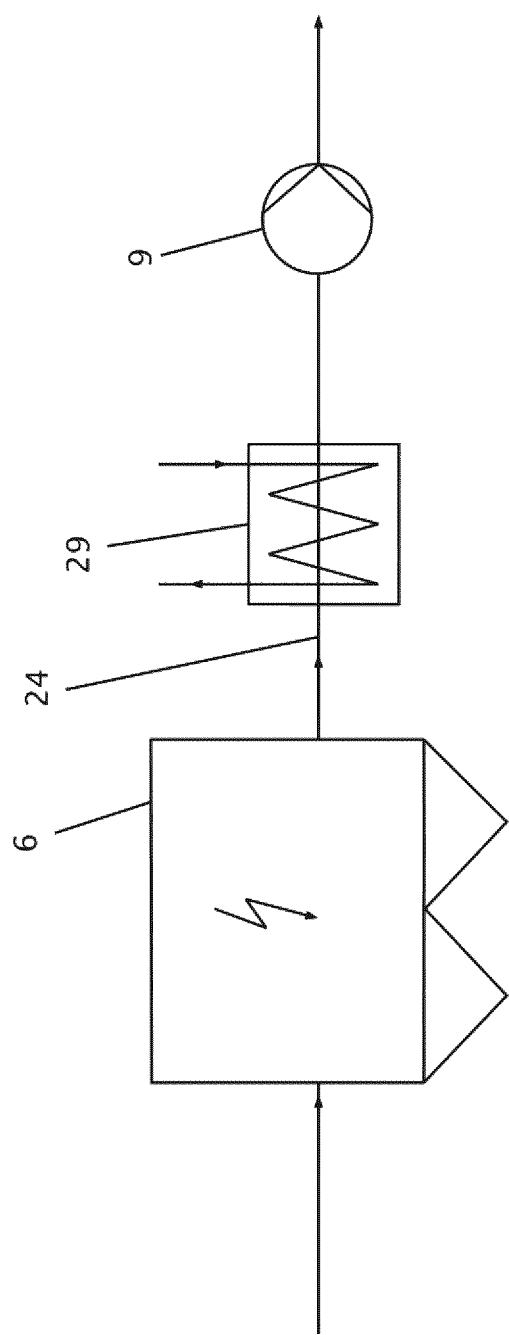
FIG. 10 shows in detail the electrostatic filter.

FIG. 10 shows in detail the electrostatic filter 6, which has also been discussed in the foregoing figures, as well as a heat exchanger 29, which is aligned downstream of the electrostatic filter 6. Said heat exchanger 29 is used for recuperation of thermal energy contained in the exhaust gas stream 24. Furthermore, the exhaust fan 9 is used to operate electrostatic filter as well as the heat exchanger 29.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, or N including any one element alone or the one element in combination with one or more of the other elements which may also include, in combination, additional elements not listed. Unless otherwise indicated or the context suggests otherwise, as used herein, "a" or "an" means "at least one" or "one or more."

The subject-matter of the disclosure may also relate, among others, to the following aspects:

A first aspect relates to a method for continuously drying bulk goods, in particular wood fibers and/or wood chips, in a dryer (1), in particular a drum dryer, which is supplied with bulk goods and through which a vapor gas mixture passes in a drying circuit, wherein the vapor gas mixture is indirectly heated via at least one heat exchanger (4) by exhaust gases produced by at least one hot gas generator (5, 31, 31') and wherein the vapor gas mixture is guided and heated up in the at least one heat exchanger (4) and wherein upstream, downstream and/or within the at least one heat exchanger (4) at least a partial flow of the vapor gas mixture is branched off (22) to be conducted into the at least one hot gas generator (5, 31, 31'), characterized in that said exhaust gases produced by at least one hot gas generator (5, 31, 31') are passed through at least one hot gas cyclone (32) which is provided in between the at least one hot gas generator (5, 31, 31') and the at least one heat exchanger (4).

A second aspect relates to the method of aspect 1, wherein said at least one hot gas generator (5, 31, 31') is fed with gases resulting from external production processes (16, 17, 27).

A third aspect relates to the method of any preceding aspect, wherein said at least one hot gas generator (5, 31, 31') comprises at least one solid fired hot gas generator (31, 31') which is supplied via the branch line (22) with a partial flow of the vapor gas mixture as primary (39), secondary (37) and/or tertiary (36) gas.

A fourth aspect relates to the method of any preceding aspect, wherein a liquid is heated indirectly by said exhaust gases by means of at least one heat exchanger (29), said at least one heat exchanger (29) preferably is arranged downstream of the at least one filter (6).

A fifth aspect relates to the method of any preceding aspect, wherein the partial flow to the at least one hot gas generator (5, 31, 31') is driven by means of at least one regulable partial vapor fan (10, 36, 37, 39, 40), wherein the partial vapor fan (10, 36, 37, 39, 40) preferably is regulated via at least one of a pollution level of the exhaust gases produced by the at least one hot gas generator (5, 31, 31'), in particular by nitrogen oxides and/or carbon monoxides in said exhaust gases, and/or an oxygen content in the exhaust gas produced by the at least one hot gas generator (5, 31, 31'), and/or maximum inert gas content in the vapor gas mixture within the drying circuit.

A sixth aspect relates to the method of any preceding aspect, wherein, at least partially, solids are used as fuel for the at least one hot gas generator (5, 31, 31'), in particular biomass, wherein preferably waste products from the production of the wooden material boards are used.

A seventh aspect relates to the method of any preceding aspect, wherein the vapor gas mixture is cleaned after passing through the dryer (1), whereby preferably as cleaning apparatus (3) at least one cyclone, in particular at least one cyclone battery is used.

An eighth aspect relates to the method of any preceding aspect, wherein the vapor gas mixture after the dryer (1) is driven by at least one drying vapor fan (8).

A ninth aspect relates to the method of any preceding aspect, wherein the water content in the dryer (1) is regulated, whereby preferably the bulk goods are metered depending on the moisture of different bulk good fractions when supplying the dryer (1).

A tenth aspect relates to a method for the manufacturing of wooden material boards, wherein wood logs are stripped of bark and are processed in a crushing apparatus to wood chips and/or fibers, wherein the wood chips and/or fibers are dried in a drying apparatus, wherein the dried wood chips and/or fibers are processed to boards in a pressing arrangement, if necessary by adding binders and/or further additives, and are preferably cut into size.

In addition to the features mentioned in each of the independent aspects enumerated above, some examples may show, alone or in combination, the optional features mentioned in the dependent aspects and/or as disclosed in the description above and shown in the figures.

REFERENCE NUMERALS USED IN THE FIGURES

1 Drum Dryer
2 Discharge Box
3 Cyclone Battery
4 Heat Exchanger
5 Multi-Fuel Burner
6 Electrostatic Filter
7 Chimney
8 Dryer Fan
9 Exhaust Air Fan
10 Regulable Partial Vapor Fan
11 Slow-Down Zone
12 Metering Device
13 Ambient Air
16 Exhaust Gas from Presses/Saws
17 Exhaust Gas from Sanding Line
18 Combustion Air Fan
19 Exhaust Air Heat Exchanger
20 Boiler House Exhaust
21 Muffle
22 Partial Air from Heat Exchanger
24 Exhaust Gas after Electrostatic Filter
25 Fresh Ambient Air
27 Exhaust Gasses from Glue Production Line
28 Thermal Oil Boiler House
29 Exhaust Air Heat Exchanger for Water
30 Nozzle Rings
31 Grate Fired Hot Gas Generator
31' Grate Fired Hot Gas Generator
32 Hot Gas Cyclone
33 Ash Exit of Multi-Fuel Burner
34 Ash Exit Hot Gas Cyclone
35 Dust Exit Electrostatic Filter
36 Tertiary Air
37 Secondary Air
38 Cooling Air
39 Primary Air
40 Cooling Air Fan
41 Muffle Cooling Air
42 Preheated Air

The invention claimed is:
1. An apparatus for drying bulk goods, the apparatus comprising:
at least one dryer;
at least one hot gas generator;
at least one first heat exchanger configured to indirectly heat a vapor gas mixture for drying the bulk goods in the at least one dryer, said at least one first heat exchanger is configured to be heated by exhaust gases produced by said at least one hot gas generator;
at least one branch line, upstream, downstream, and/or within the at least one first heat exchanger, the at least one branch line configured to branch off a partial flow of the vapor gas mixture and guide the partial flow of the vapor gas mixture to the at least one hot gas generator; and
at least one line for the remaining partial flow of the vapor gas mixture, the at least one line configured to guide the remaining partial flow of the vapor gas mixture to the at least one dryer;
wherein at least one hot gas cyclone is between the at least one hot gas generator and the at least one first heat exchanger, so that the exhaust gases produced by said at least one hot gas generator are passed through the at least one hot gas cyclone,
wherein the hot gas cyclone is adapted to operate at temperatures below the ash sintering point,
wherein the hot gas cyclone is equipped with a continuously operated ash/soot discharge system,
wherein said at least one hot gas generator comprises at least one solid fired hot gas generator and at least one multi-fuel burner in addition to the at least one solid fired hot gas generator,
wherein the at least one multi-fuel burner allows the combustion of fossil fuels or dust-like solids, wherein the at least one solid fired hot gas generator allows the combustion of combustible organic material in any particular form and is enabled to combust solid materials, which cannot be combusted in the at least one multi-fuel burner, and wherein the at least one hot gas cyclone is arranged such that the exhaust gases produced by the at least one solid fired hot gas generator and the exhaust gases produced by the at least one multi-fuel burner are led to and cleaned by the at least one hot gas cyclone and such that the gases cleaned by the at least one hot gas cyclone are subsequently used to heat the vapor gases for drying the bulk goods inside the at least one dryer by indirect heat exchanging inside the at least one heat exchanger;

wherein the at least one branch line is configured to branch off a partial flow of the vapor gas mixture and guide one part of the partial flow of the vapor gas mixture to the at least one solid fired hot gas generator and a further part of the partial flow of the vapor gas mixture to the at least one multi-fuel burner.

2. The apparatus according to claim 1, wherein at least one filter is configured to clean the exhaust gases produced by said at least one hot gas generator; and downstream of said at least one filter, at least one second heat exchanger which is configured to indirectly heat gases used as feeding air for said at least one hot gas generator is provided, said at least one second heat exchanger is configured to be heated by said exhaust gases.

3. The apparatus according to claim 2, wherein a hot gas generator exhaust gas fan is positioned downstream of the at least one filter.

4. The apparatus according to claim 1,
wherein the at least one multi-fuel burner and the at least one solid fired hot gas generator are configured to be independent or in parallel, said at least one multi-fuel burner including a combustion chamber with a muffle in which a fuel/combustion air mixture is ignited and burned, and a combustion chamber ceiling;

wherein said combustion chamber ceiling comprises
at least one inlet for combustion air into the muffle,
an outer nozzle ring configured to form an inlet for a cooling gas surrounding the muffle, and
an inner nozzle ring configured to form an inlet for a cooling gas inside the muffle, the inner nozzle ring configured to provide a laminar flow of cooling gas along the muffle;

wherein said inner nozzle ring and outer nozzle ring are configured to be separately controllable and said inner nozzle ring is configured to be fed with gas exhausted by the at least one solid fired hot gas generator, with ambient air, and/or with gases that result from external production processes.

5. The apparatus according to claim 4, wherein the inner nozzle ring and/or the outer nozzle ring comprises an entering angle of approximately 0 degrees to approximately 60 degrees.

6. The apparatus according to claim 1, wherein said at least one hot gas generator is configured to be fed with gases that result from external production processes.

7. The apparatus according to claim 1, wherein said at least one solid fired hot gas generator is configured to be supplied via the at least one branch line with a partial flow of the vapor gas mixture as primary, secondary, and/or tertiary gas.

8. The apparatus according to claim 1, wherein at least one additional heat exchanger is configured to indirectly heat a liquid, said at least one additional heat exchanger is configured to be heated by said exhaust gases.

9. The apparatus according to claim 1, wherein at least one regulable partial vapor fan is in the at least one branch line to the hot gas generator.

10. The apparatus according to claim 1, wherein a cleaning arrangement is configured to clean the vapor gas mixture which is discharged from the at least one dryer.

11. The apparatus according to claim 1, wherein at least one drying vapor fan is downstream of the dryer.

12. The apparatus according to claim 1, wherein a metering device is configured to regulate the water content in the dryer.

13. An arrangement for manufacturing wooden material boards comprising: the apparatus of claim 1, at least one crushing device, at least one drying device, and at least one pressing device.

14. A method for continuously drying bulk goods in at least one dryer which is supplied with bulk goods and through which a vapor gas mixture passes in a drying circuit, the method being conducted by using the apparatus according to claim 1 and the method comprising:

heating the vapor gas mixture indirectly via the at least one first heat exchanger, the at least one first heat exchanger configured to be heated by exhaust gases produced by at least one hot gas generator;

guiding the vapor gas mixture to the at least one first heat exchanger in which the vapor gas mixture is heated;

branching off at least a partial flow of the vapor gas mixture, upstream, downstream, and/or within the at least one first heat exchanger, wherein the at least the partial flow of the vapor gas mixture is conducted into the at least one hot gas generator, passing said exhaust gases produced by the at least one hot gas generator through the at least one hot gas cyclone and cleaning said exhaust gases by the at least one hot gas cyclone, and using the gases cleaned by the at least one hot gas cyclone to heat the vapor gases for drying the bulk goods inside the at least one dryer by indirect heat exchanging inside the at least one heat exchanger.

15. The method according to claim 14, the method further comprising the following steps:

cleaning said exhaust gases produced by said at least one hot gas generator by at least one filter; and using the exhaust gases produced by said at least one hot gas generator downstream of said at least one filter to indirectly heat gases used as feeding air for said at least one hot gas generator via at least one second heat exchanger.

16. The method according to claim 15, the method further comprising the step of operating the filter in suction mode.

* * * * *